(12) United States Patent
Weiland et al.

(10) Patent No.: US 11,796,097 B2
(45) Date of Patent: Oct. 24, 2023

(54) COUPLING PART FOR A HOSE COUPLING

(71) Applicant: Walter Stauffenberg GmbH & Co. KG, Werdohl (DE)

(72) Inventors: Fritz Georg Weiland, Meinerzhagen (DE); Ulrich Stefan Koenig, Herscheid (DE)

(73) Assignee: Walter Stauffenberg GmbH & Co. KG, Werdohl (DE)

( * ) Notice: Subject to any disclaimer, the term of this patent is extended or adjusted under 35 U.S.C. 154(b) by 0 days.

(21) Appl. No.: 17/771,062

(22) PCT Filed: Dec. 9, 2020

(86) PCT No.: PCT/EP2020/085231
§ 371 (c)(1),
(2) Date: Apr. 22, 2022

(87) PCT Pub. No.: WO2021/122204
PCT Pub. Date: Jun. 24, 2021

(65) Prior Publication Data
US 2022/0373116 A1 Nov. 24, 2022

(30) Foreign Application Priority Data
Dec. 19, 2019 (EP) ..................................... 19218253

(51) Int. Cl.
*F16L 33/20* (2006.01)
*F16L 33/207* (2006.01)

(52) U.S. Cl.
CPC ................................ *F16L 33/2076* (2013.01)

(58) Field of Classification Search
CPC ............... F16L 33/2076; F16L 33/2073; F16L 33/2071; F16L 33/207
See application file for complete search history.

(56) References Cited

U.S. PATENT DOCUMENTS

| 3,185,500 | A | * | 5/1965 | Luther | ................ | F16L 33/2076 |
| | | | | | | 285/256 |
| 9,212,771 | B2 | * | 12/2015 | Baldwin | ............. | F16L 33/2073 |
| 2017/0051858 | A1 | * | 2/2017 | Thibodeaux | ........ | F16L 33/2073 |

FOREIGN PATENT DOCUMENTS

DE 23 31 977 A1 1/1974
DE 20 2004 008 126 U1 7/2004
(Continued)

OTHER PUBLICATIONS

International Search Report in PCT/EP2020/085231, dated Mar. 4, 2021.

*Primary Examiner* — Zachary T Dragicevich
*Assistant Examiner* — James A Linford
(74) *Attorney, Agent, or Firm* — Collard & Roe, P.C.

(57) ABSTRACT

A coupling part for a hose coupling, in particular for high-pressure hydraulic lines, and a hose coupling having such coupling part, has a connection head for connecting to a fitting, and, formed on the connection head, a press-fit nipple, which is intended for accommodating a hose-end portion, on which a pushed-on hose-end portion can be fastened in a sealing manner by pressing action by an at least partially sleeve-form press-fit ferrule enclosing the hose-end portion, and which has a rib profile including ribs bounded by grooves. The rib profile has at least two profile portions. The grooves of the first profile portion, which is directed towards the connection head, have a symmetrical cross section and the grooves of the second profile portion have an asymmetrical cross section and a larger groove volume than the grooves of the first profile portion.

13 Claims, 3 Drawing Sheets

(56) References Cited

FOREIGN PATENT DOCUMENTS

Figure 1A:
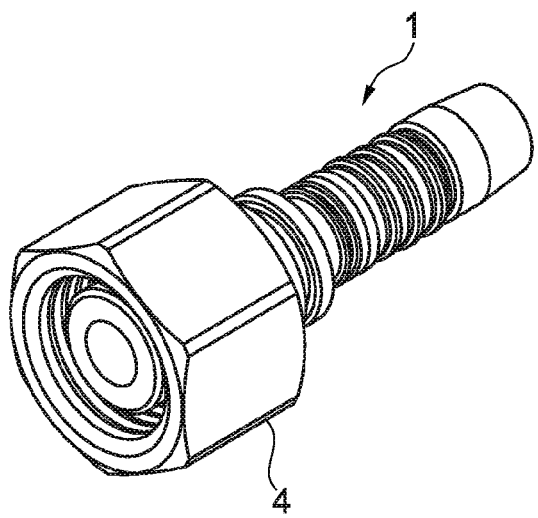

| | | | | |
|---|---|---|---|---|
| DE | 102005032420 A1 | * | 2/2007 | ............ F16L 13/143 |
| EP | 0405245 A2 | * | 1/1991 | |
| EP | 1 007 875 B1 | | 6/2000 | |
| EP | 1184613 A2 | * | 3/2002 | .......... F16L 33/2076 |
| EP | 1 300 622 A1 | | 4/2003 | |
| FR | 1372180 A | * | 9/1964 | |
| GB | 1 402 291 A1 | | 8/1975 | |

* cited by examiner

COUPLING PART FOR A HOSE COUPLING

CROSS REFERENCE TO RELATED APPLICATIONS

This application is the National Stage of PCT/EP2020/085231 filed on Dec. 9, 2020, which claims priority under 35 U.S.C. § 119 of European Application No. 19218253.3 filed on Dec. 19, 2019, the disclosure of which is incorporated by reference. The international application under PCT article 21(2) was not published in English.

The invention relates to a coupling part for a hose coupling, in particular for high-pressure hydraulic lines, in accordance with the preamble of claim 1. The invention furthermore relates to a hose coupling in accordance with claim 13.

A coupling element for high-pressure hydraulic lines is known from the German utility model DE 20 2004 008 126 U1. This coupling element comprises a tube-like connector piece, which has a hose nipple and means for connecting to a fitting. A hose holding apparatus in the form of rib-like forms is provided on the hose nipple. The high-pressure hose used is generally multi-layered and contains a metal insert, in a known manner, which insert is necessary for high-pressure applications. For installation, the hose nipple of the coupling element is pushed into the inner hose of the high-pressure hose to be attached. The rib-like forms then prevent the hose from being easily pulled off. As a rule, a press-fit ferrule that sits on the hose end is pushed onto the hose nipple at the same time along with the high-pressure hydraulic hose. For a firm connection of the high-pressure hydraulic hose to the coupling element, the press-fit ferrule is pushed onto the coupling element by means of pushing it radially. During the pushing process, elongation stresses of the inner hose relative to the hose body can occur, and this can lead to micro-cracks in the inner hose, and thereby the seal of the connection with the high-pressure line is no longer guaranteed.

This is where the invention seeks to provide a remedy. The invention is based on the task of creating a coupling part for a hose coupling in which the risk of micro-cracks in the inner hose body is avoided when a press-fit ferrule that sits on the end of the hose from the outside is pushed on. According to the invention, this task is accomplished by means of a coupling part having the characteristics of the characterizing part of claim 1.

With the invention, a coupling part for a hose coupling is created, in which the risk of micro-cracks in the inner body of the hose when pushing on a press-fit ferrule that sits on the hose end from the outside is avoided. Because of the fact that the rib profile has at least two profile sections, wherein the grooves of a first profile section that faces the connection head have a symmetrical cross-section, and the grooves of a second profile section, arranged adjacent to the first profile section, have an asymmetrical cross-section, which has a greater groove volume as compared with the grooves of the first profile section, a holding capacity of the grooves that is required in accordance with the axial forces that act on the inner hose and the material displacements caused by them is brought about.

In a further development of the invention, the grooves of the second profile section have a greater groove volume than the grooves of the first profile section. In this way, the stress on the inner hose when the press-fit ferrule is pushed on is further reduced. It has been shown that the required material holding capacity of the grooves decreases in the direction of the connection head. Because of the asymmetrically configured profile section, both a sufficient holding capacity for the inner hose material during the push-on process and a required pull-off inhibition, with simultaneously low resistance to pushing the hose section onto the press-fit nipple, are brought about.

In an embodiment of the invention, a cylindrical section, which has a symmetrical groove on its side facing the first profile section and makes a transition into an asymmetrical groove on its side facing the second profile section, is arranged between the first profile section and the second profile section. In this way, good guidance of the hose section to be pushed on is achieved. Furthermore good axial fixation of a pushed on press-fit ferrule is achieved by means of the cylindrical section, with the ferrule forming an undercut around this cylindrical section.

In a further embodiment of the invention, the asymmetrical grooves have a trough-shaped cross-section, which has a flat groove bottom that is delimited by two groove walls set at an angle, which angles have different pitch, wherein the inflow wall that faces the connection head has a lesser pitch than the sealing wall that faces away from the connection head. In this way, inflow of displaced inner hose volume is promoted, and thereby material stress is reduced. The material is guided against the sealing wall by the inflow wall, and accumulates there, thereby bringing about both a good sealing effect and good inhibition against being pulled off.

In a further embodiment of the invention, the inflow wall encloses an angle $\alpha$ with the groove bottom that is greater than or equal to 155 degrees and less than or equal to 165 degrees, preferably 160 degrees. It has been shown that in this way particularly low material stress on the inner mantle of the hose is achieved. It is advantageous if the sealing wall encloses an angle $\beta$ with the groove bottom that is greater than or equal to 115 degrees and less than or equal to 125 degrees, preferably 120 degrees.

In a further development of the invention, the press-fit nipple has a thread-on section on its end that lies opposite the connection head, which section is formed from a cylindrical section part, which makes a transition into a conical end section. In this way, pushing a hose section on is facilitated. Preferably the cylindrical section part is delimited by a sealing wall of an asymmetrical groove.

In an embodiment of the invention, the second profile section has at least two, preferably at least three, particularly preferably at least four asymmetrical grooves. In this way, a sufficient holding capacity for inner hose material is made available when pushing on the press-fit ferrule, and thereby the material stress is minimized and, at the same time, the sealing effect is maximized.

In a further embodiment of the invention, at least one of the asymmetrical grooves has a smaller groove volume than a further asymmetrical groove that lies adjacent in the direction of the thread-on section, wherein preferably all the asymmetrical grooves of the second profile section have a greater groove volume, the less their distance is from the thread-on section. In this way, a material holding capacity that is sufficient during pushing on, in accordance with the material displacement of the inner mantle of the hose, is made available.

In a further development of the invention, the first profile section has at least two ribs, wherein the first rib, viewed from the connection head, has a greater outside diameter as compared with the remaining mantle surface of the press-fit nipple, and wherein the mantle surface of this first rib preferably has an arc-shaped, particularly a circular arc-shaped, cross-section. In this way, good fixation of a hose section that has been pushed on is achieved, which section can be easily pushed over the first rib, because of its circular arc-shaped cross-section, in spite of the greater diameter of this rib.

In an embodiment of the invention, a cylindrical holding piece is arranged between the connection head and the press-fit nipple, on which piece a holding ridge that runs circumferentially, at least in certain regions, is formed, the outside diameter of which ridge is greater than the maximum diameter of the press-fit nipple. In this way, a reliable connection with the press-fit ferrule is achieved.

An object of the present invention is furthermore a hose coupling having such a coupling part and a press-fit ferrule that is sleeve-shaped, at least in certain regions, which ferrule can be mounted onto a hose section that has been pushed onto the press-fit nipple of the coupling part, and can be pushed on by means of radially acting pressure, to fasten it onto the press-fit nipple, wherein the press-fit ferrule is provided with a claw profile on its inner mantle surface, which profile is formed by circumferential claw ribs that are directed radially inward and have an essentially triangular cross-section, for penetrating into the outer mantle surface of the hose section during the push-on process, and wherein the claw profile preferably has a saw-tooth-shaped cross-section.

In a further development of the invention, the press-fit ferrule has a holding groove ahead of the claw profile, into which groove a holding ridge arranged on the coupling part between the connection head and the press-fit nipple engages after the press-fit ferrule has been pushed onto the press-fit nipple.

Figure 1B:
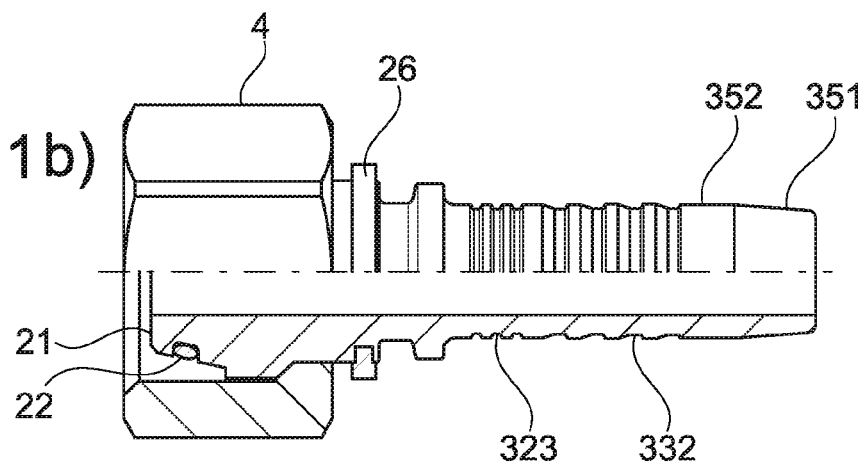
Figure 1C:
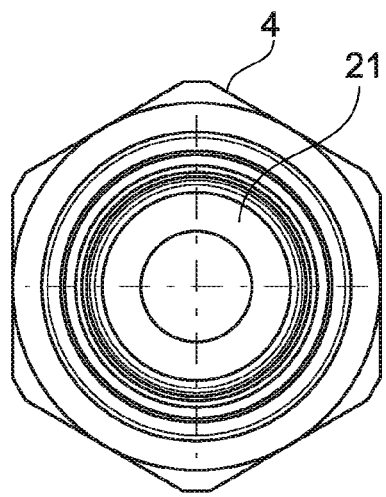
Figure 2:
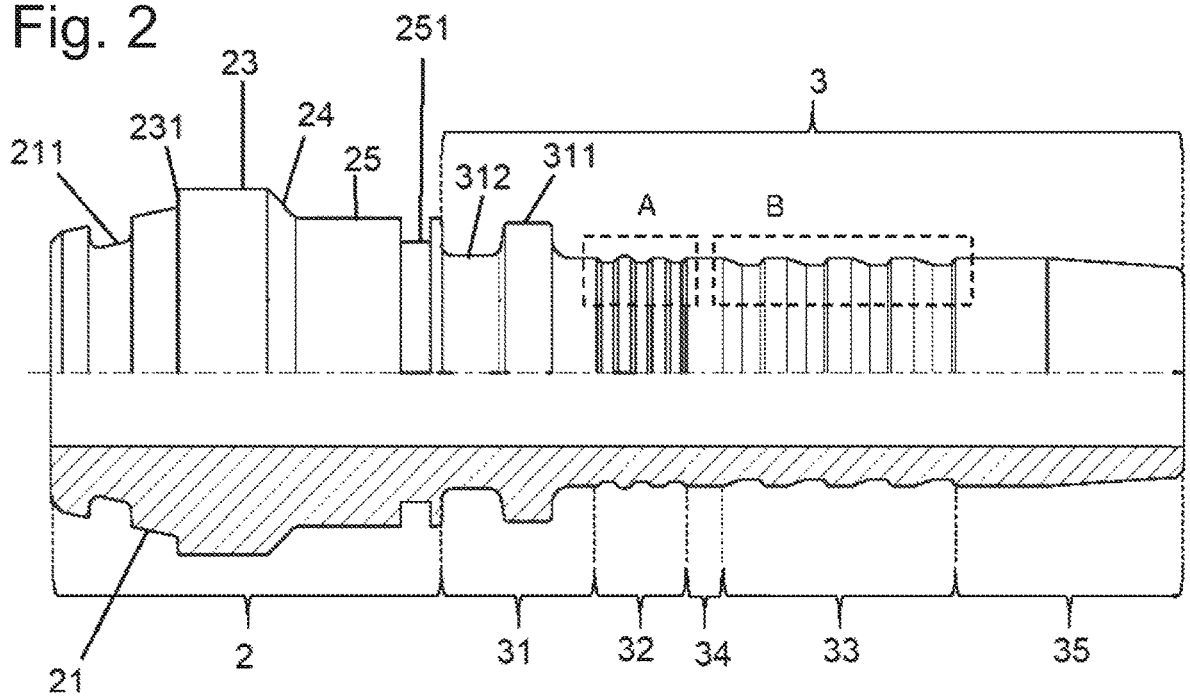
Figure 3:
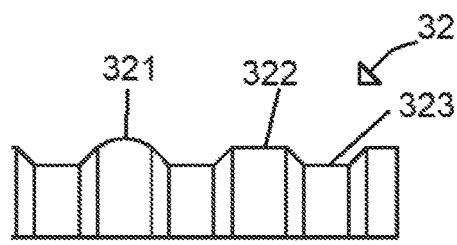
Figure 4:
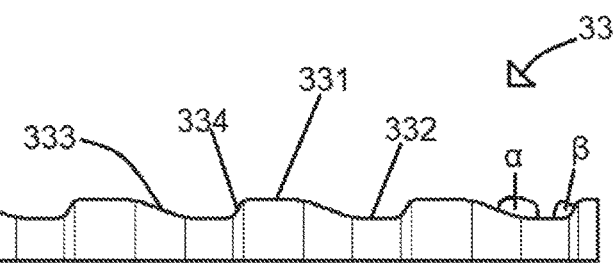
Figure 5:
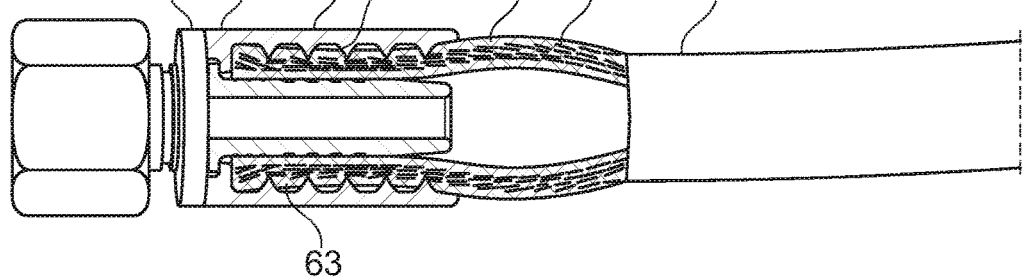
Figure 6:
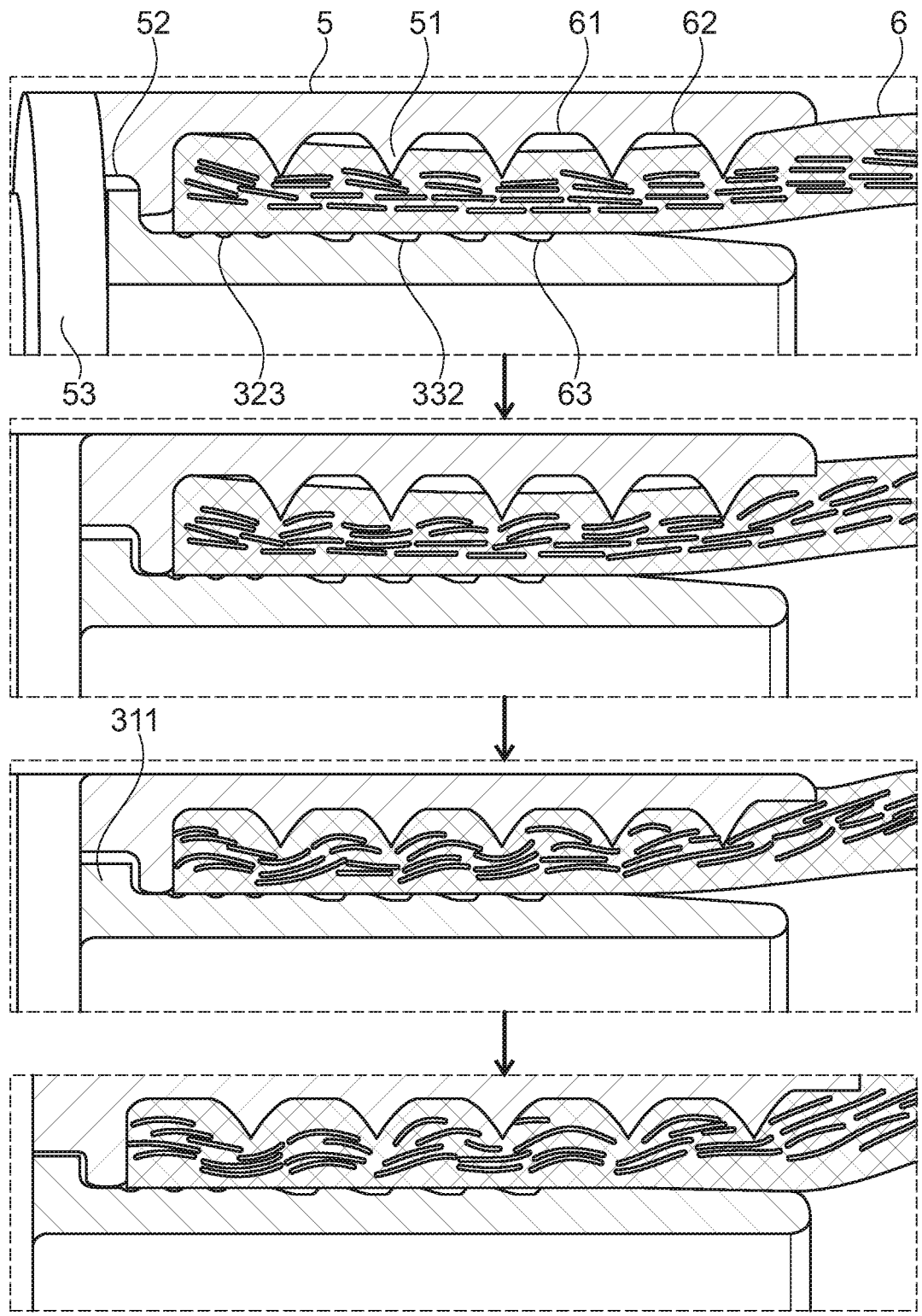

Other further developments and embodiments of the invention are indicated in the other claims. An exemplary embodiment of the invention is shown in the drawings and will be described in detail below. The figures show:

FIGS. 1a, 1b, and 1c are schematic representations of a coupling part
in a spatial representation (FIG. 1a);
in a partial longitudinal section (FIG. 1b); and
in a top view (FIG. 1c);

FIG. 2 the schematic representation of the press-fit nipple of the coupling part from FIG. 1 in a partial longitudinal section;

FIG. 3 the detail representation of the first profile section "A" from FIG. 2;

FIG. 4 the detail representation of the second profile section "B" from FIG. 2;

FIG. 5 the representation of a hose coupling with a hose mounted by means of a press-fit ferrule;

FIG. 6 the detail representation of the hose behavior when pushing on the press-fit ferrule, in four consecutive press-fit states.

The coupling part 1 selected as an example comprises a connection head 2 on which a press-fit means 3 is formed. Along its center longitudinal axis, the coupling part 1 is provided with a passage bore 11.

The connection head 2 has a plug part 21, which is provided with a groove 211 for holding a sealing ring 22. The plug part 21 is followed by a diameter-widening collar 23, by means of which a stop 231 is formed. On its side that lies opposite the stop 231, the collar 23 is provided with a chamfer 24, which is followed by a cylindrical section 25. The cylindrical section 25 is provided with a groove 251 for holding a circlip 26. The connection head 2 holds a union nut 4 that lies against the chamfer 24 and is held in place axially by the circlip 26, preventing it from coming loose.

The press-fit nipple 3 is essentially formed by a holding section 31, followed by a first profile section 32 and a second profile section 33, between which a cylindrical section 34 is arranged. On the end side, a thread-on section 35 follows the second profile section 33.

The holder section 31 is configured to be essentially cylindrical, and has a holding collar 311, which, together with the cylindrical section 25 of the connection head 2, delimits a holding groove 312. The holding section 31 is followed by the first profile section 32, which has two ribs 321, 322 that are arranged parallel to one another in the exemplary embodiment, and are delimited by three symmetrical grooves 323. The grooves 323 have a cross-section in the form of an equilateral trapezoid. The first rib 321, viewed from the direction of the connection head 2, has an outside diameter that is greater as compared with the second rib 322. In this regard, the mantle surface of this first rib 321 has a circular arc-shaped cross-section.

In the exemplary embodiment, the second profile section 33 has three ribs 331 that are arranged parallel to one another, each of which is delimited by means of asymmetrical grooves 332. The asymmetrical grooves 332 have a trough-shaped cross-section, which has a flat groove bottom, delimited by two groove walls set at an angle, which angles have a different pitch. The groove wall that faces the connection head 2 forms an inflow wall 333 and has a lesser pitch than the groove wall that faces away from the connection head 2, which wall forms a sealing wall 334. In the exemplary embodiment, the inflow wall encloses an angle of 160° with the groove bottom, and the sealing wall encloses an angle of 120° with the groove bottom. The grooves 332 are dimensioned in such a manner that they have a greater groove volume than the symmetrical grooves 323 of the first profile section 32.

In this regard, the asymmetrical grooves 332 are dimensioned, relative to one another, in such a manner that they have a greater groove volume, in each instance, the less their distance is from the thread-on section 35.

The thread-on section 35 is configured essentially cylindrically, and has a cylindrical section 352 that makes a transition into a conically narrowing end section 351.

In FIG. 5, a hose coupling having such a coupling part 1 is shown before the press-fit ferrule is pushed on. In this regard, a hose section 6 is pushed onto the press-fit nipple 3 of the coupling part 1 until the latter lies against the holding section 31. In this regard, the top rubber 61 of the hose section 6 was peeled down all the way to the wire braid 62 in the region of the press-fit ferrule 5. During the peeling process, the wire braid 62 is not allowed to be damaged, since it imparts pressure strength to the inner hose 63. The diameter of the hose section 6 is selected in such a manner that it is smaller than or agrees with the inside diameter of the press-fit ferrule 5, which has been set over the hose section 6 with its claw profile 51. Ahead of the claw profile 51, the press-fit ferrule 5 has a holding groove 52, into which the holding collar 311 of the press-fit nipple 3 engages after the press-fit ferrule has been pushed on.

The press-fit ferrule 5 is configured essentially as a hollow cylinder, and has a claw profile 51 on its inner side. A holding groove 52 is arranged ahead of the claw profile, which groove is delimited by a head disk 53 situated on the end side and provided with a bore. The outer contour of the press-fit ferrule 5 can be configured differently, depending on the corresponding area of use of the hose coupling. Thus, for example, it can have a round or also a polygonal cross-section. The wall thickness of the press-fit ferrule is selected in such a manner that it can withstand the force that acts radially outward and is caused by the fluid that flows in the hose section 6.

For mounting the hose coupling onto the hose section 6 in such a manner as to prevent it from being pulled off, a radially acting pressure is applied to the press-fit ferrule 5 from the outside. This external pressure brings about compression of the press-fit ferrule 5, and thereby the claws of the claw profile 51 are pressed into the wire braid 62 of the hose section 6, and lead to a firm connection between coupling part 1 and hose section 6. Furthermore, the press-fit ferrule 5 is compressed in such a manner that the holding groove 52 of the press-fit ferrule 5 engages around the holding collar 311 of the press-fit nipple 3, and thereby the press-fit ferrule 5 is connected with the press-fit nipple 3 with shape fit. In this regard, the bore of the head disk 53 lies against the holding groove 312 of the holding section 31 of the press-fit nipple 3.

Different press-down states of the hose coupling during the process of pushing the press-fit ferrule on are shown in FIG. 6 in a longitudinal-section representation. In this regard, the behavior of the inner hose 63 of the hose section 6 during the push-on process can be clearly seen. As the press-fit ferrule 5 is increasingly being pushed on, an axial displacement or elongation of the inner hose 63 relative to the wire braid 62 can be seen. The inner hose material, which is compressed by this process, can run into the asymmetrical grooves 332 almost without resistance, by way of the inflow walls 333 of the asymmetrical grooves 323 of the second profile section 33, until it is piled up against the sealing walls 334 of the asymmetrical grooves 332, and as a result, a great sealing effect is achieved with minimal stress on the inner hose material. In this regard, the inner hose 63 lies against the symmetrical grooves 323 of the first profile section 32, forming a seal and a good hold, in the region of the first profile section, where almost no axial displacement of the inner hose material takes place. The force-fit and shape-fit hold between the press-fit ferrule 5 and the holding section 31 of the coupling part 1, achieved by means of pushing the ferrule on, is furthermore clearly evident, wherein the holding groove 52 of the press-fit ferrule 5 is pushed on around the holding collar 311 of the holding section 31.

The coupling part according to the invention is suitable for a great range of hoses. As a function of the outside diameter of the hose section to be held, a corresponding press-fit ferrule 5 must be selected, by way of which the hose section 6 is then pushed on, together with the coupling part 1.

The invention claimed is:

1. A coupling part for a hose coupling comprising:
    a connection head for connecting to a fitting; and
    a press-fit nipple formed on the connection head for holding a hose end section, on which the pushed-on hose end section (6) can be fastened using a press-fit ferrule that surrounds the hose end section and is sleeve-shaped at least in certain regions, forming a seal, by being pushed on, and which has a rib profile that comprises ribs delimited by grooves;
    wherein the rib profile has at least two profile sections;
    wherein the grooves of the first profile section that faces the connection head have a symmetrical cross-section, and the grooves of the second profile section have an asymmetrical cross-section;
    wherein the grooves of the second profile section have a greater groove volume as compared with the grooves of the first profile section
    wherein the second profile section has at least two asymmetrical grooves; and
    wherein at least one of the asymmetrical grooves has a smaller groove volume than a further asymmetrical groove that lies adjacent in the direction of the thread-on section.

2. The coupling part according to claim 1, wherein a cylindrical section is arranged between the first profile section and the second profile section, which cylindrical section makes a transition, on a side of the cylindrical section facing the first profile section, into a symmetrical groove, and, on a side of the cylindrical section facing the second profile section, into an asymmetrical groove.

3. The coupling part according to claim 1,
    wherein the asymmetrical grooves have a trough-shaped cross-section, which has a flat groove bottom that is delimited by two groove walls set at an angle, which angles have different pitch,
    wherein the inflow wall that faces the connection head has a lesser pitch than the sealing wall that faces away from the connection head.

4. The coupling part according to claim 3, wherein the inflow wall encloses an angle α with the groove bottom that is greater than or equal to 155 degrees and less than or equal to 165 degrees.

5. The coupling part according to claim 3, wherein the sealing wall encloses an angle β with the groove bottom that is greater than or equal to 115 degrees and less than or equal to 125 degrees.

6. The coupling part according to claim 1, wherein the press-fit nipple has a thread-on section on an end of the press-fit nipple that lies opposite the connection head, which section is formed from a cylindrical section part, which makes a transition into a conical end section.

7. The coupling part according to claim 6, wherein the cylindrical section part is delimited by a sealing wall of an asymmetrical groove.

8. The coupling part according to claim 1, wherein the second profile section has at least three asymmetrical grooves.

9. The coupling part according to claim 1,
    wherein all the asymmetrical grooves of the second profile section have a greater groove volume, the less their distance is from the thread-on section.

10. The coupling part according to claim 1,
    wherein the first profile section has at least two ribs;
    wherein the first rib, viewed from the connection head, has a greater outside diameter as compared with the remaining mantle surface of the press-fit nipple; and
    wherein the mantle surface of the first rib has an arc-shaped cross-section.

11. The coupling part according to claim 1, wherein a cylindrical holding section is arranged between the connection head and the press-fit nipple, on which section a holding collar that runs circumferentially, at least in certain regions, is formed, the outside diameter of which collar is greater than the maximum diameter of the press-fit nipple.

12. A hose coupling, comprising,
    the coupling part according to claim 1; and
    a press-fit ferrule that is sleeve-shaped, at least in certain regions, which ferrule can be mounted onto a hose section that has been pushed onto the press-fit nipple of the coupling part, and can be pushed on by radially acting pressure, to fasten the ferrule onto the press-fit nipple;
    wherein the press-fit ferrule is provided with a claw profile on an inner mantle surface of the ferrule, which profile is formed by circumferential claw ribs that are directed radially inward and have an essentially triangular cross-section, for penetrating into the outer mantle surface of the hose section during the push-on process; and wherein the claw profile has a saw-tooth-shaped cross-section.

13. The hose coupling according to claim 12, wherein the press-fit ferrule has a holding groove ahead of the claw profile, into which groove a holding collar arranged between the connection head and the press-fit ferrule engages after the press-fit ferrule has been pushed onto the press-fit nipple.

* * * * *